Oct. 7, 1941.  B. C. PLACE  2,257,855
FASTENER
Filed March 27, 1939
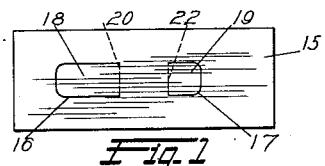
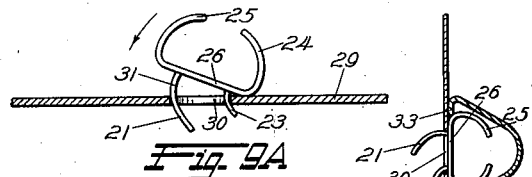
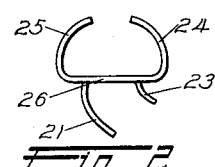
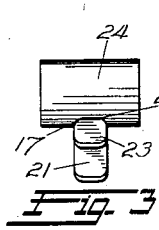
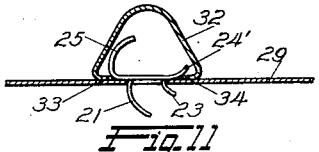
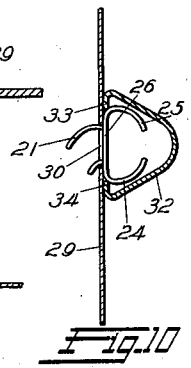
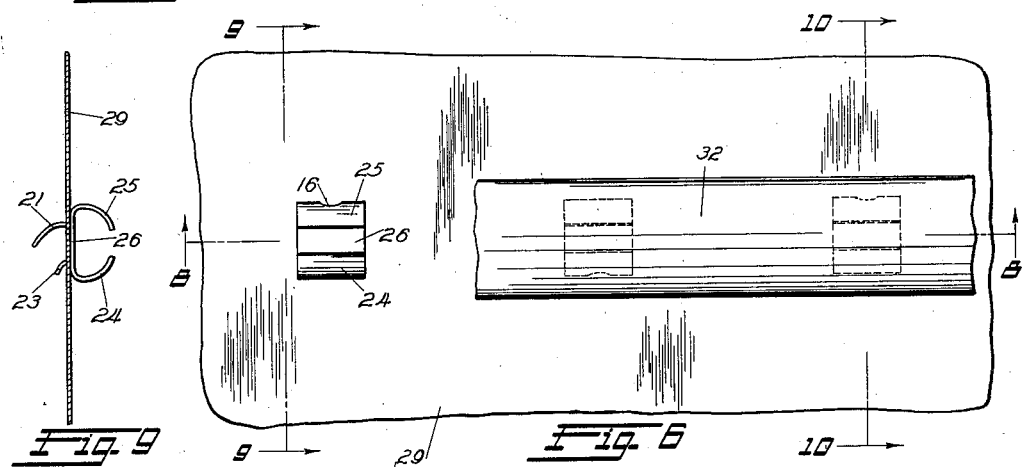
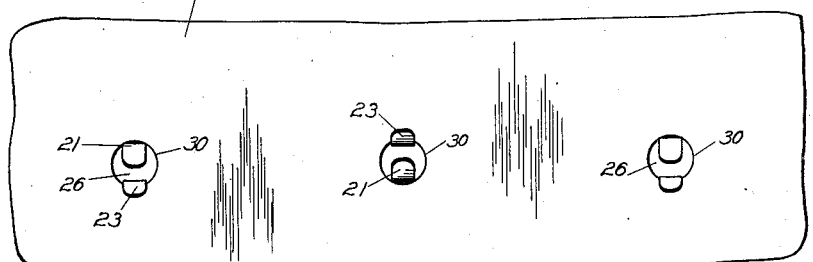
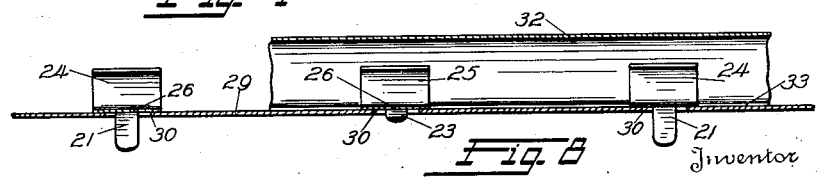
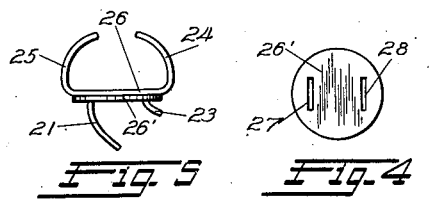
Inventor
Bion C. Place
By Strauch & Hoffman
Attorneys Patented Oct. 7, 1941

2,257,855

UNITED STATES PATENT OFFICE 2,257,855

FASTENER

Bion C. Place, Detroit, Mich., assignor of one-half to George E. Gagnier, Detroit, Mich.

Application March 27, 1939, Serial No. 264,420

4 Claims. (Cl. 189—88)

The present invention relates to a fastener capable of being constructed from sheet metal at low cost, and especially designed for securing hollow moldings or the like in place upon a support. More particularly, the invention involves an improved spring stud fastener capable of being readily applied to the support for the molding and having yieldable portions with which the molding may be snapped into engagement after the fasteners have been attached to the molding support.

Spring or snap fasteners of wire or sheet metal are now being very widely used in attaching moldings to various parts of automobiles and the like. In some instances, the fasteners have a snap fastener engagement only with the structure to which the molding is attached. In other instances, a snap fastener engagement is provided between the fastener and the molding as well as between the fastener and the structure to which the molding is applied.

Many arrangements heretofore proposed have not proven satisfactory in use because of inadequacy in the holding power of a part of the fastener, or because of the failure of the fastener to function so as to insure an absence of play between the fastener, the supporting structure and/or the molding.

The primary purpose of the present invention is to provide an improved sheet metal fastener particularly designed to provide a snap fastener engagement both with the structure to which the molding is applied and with the molding itself, and which serves to secure the molding to the supporting structure with rigidity and without looseness in spite of the fact that the parts are assembled by snap fastener action.

A still further object of the invention is to provide a double snap fastener that may be constructed at extremely low cost from a single strip of sheet metal of uniform width, the part of the fastener to engage the supporting structure being formed simply by striking tongues from the body of the strip.

A still further object of the invention is to provide an improved snap fastener having a stud part consisting only of two legs, one of which provides a hooked engagement with one side of a socket or opening in the supporting structure and the other of which provides the usual snap fastener engagement with the other side of the socket or opening, the fastener being designed for assembly by a rocking action instead of by the straight line insertion of the fastener characterizing ordinary snap fasteners.

A still further object of the invention is to provide an improved snap fastener consisting of a shank part including only two laterally curved legs of varying length arranged in approximate parallelism.

Another object of the invention is to provide an improved molding fastener having a portion bearing upon the support between the molding flanges over a substantial area which fastener is so designed as to facilitate the sealing of the opening in which the stud part of the fastener is engaged.

This invention also aims to provide a molding fastener furnishing an improved snap fastener engagement with the molding and insuring an absence of play between the molding and the fastener regardless of such variations in dimensions of the molding as ordinarily occur in actual practice.

Another object of the invention is to provide an improved combination of molding supporting structure fastener and a sealing means which does not interfere with the ready assembly of the structures while yet providing a seal of high efficiency.

A still further object of the invention will appear as a description thereof proceeds with reference to the accompanying drawing in which:

Figure 1 is a plan view of a blank from which the fastener at present preferred may be constructed;

Figures 2 and 3 are respectively side and edge views of the fastener formed from the blank of Figure 1;

Figure 4 is a plan view of a sealing gasket which may be used with the fastener of Figures 2 and 3;

Figure 5 is an edge view of the fastener having the gasket of Figure 4 in assembled relation thereto;

Figure 6 is a fragmentary plan view showing a section of molding applied to a supporting structure by means of the fastener of Figures 2 and 3;

Figure 7 is a plan of the structure illustrated in Figure 6 as seen from the underside thereof;

Figure 8 is a sectional view taken on the plane indicated by the line 8—8 of Figure 6 looking in the direction of the arrows;

Figure 9 is a transverse sectional view taken on the plane indicated by the line 9—9 in Figure 6 looking in the direction of the arrows;

Figure 9A is a sectional view similar to Figure 9 but showing the fastener in partially applied position on a larger scale;

Figure 10 is a transverse sectional view taken on the plane indicated by the line 10—10 in Figure 6 looking in the direction of the arrows; and Figure 11 is a view similar to Figure 10 but illustrating a modified form of fastener.

Like reference characters indicate like parts throughout the several figures.

The blank, from which the fastener at present preferred is made, consists simply of an elongated strip of sheet metal 15 of uniform width from end to end so that the strip may be cut from a sheet of metal without waste. U-shaped incisions 16 and 17 are formed in the body of the strip. A tongue 18 is separated from the strip by the incision 16, while the tongue 19 is separated from said body by incision 17.

In forming the fastener from the blank, the tongue 18 is bent downwardly out of the plane of the blank on the dotted line 20 and is curved laterally producing a leg 21. The tongue 19 is likewise bent downwardly out of the plane of the body on the dotted line 22 and is curved laterally producing a leg 23 which is approximately parallel to but much shorter than the leg 21.

The opposite ends of the blank are then bent upwardly and inwardly towards each other producing inwardly curved flanges 24 and 25 into engagement with which the molding may be snapped in a manner hereinafter described. The remainder 26 of the strip is maintained in its original flat form, this portion of the fastener providing a bearing over a substantial area of the supporting structure as hereinafter pointed out.

The fastener just described is intended to be applied to a metallic supporting structure by entering the legs 21 and 23 in an aperture therein. It is sometimes desirable to seal the aperture in the supporting structure through which said legs extend. When this is desired, the fastener just described is especially adapted to readily provide such seal. When a seal is desired a gasket 26', preferably in the form of a relatively thin soft rubber disc having slits 27 and 28 therein, through which the legs 21 and 23 may be passed, is assembled with respect to the fastener by passing said legs through the slits 27 and 28 and disposing the gasket into contact with the flat under surface of the portion 26.

The manner in which the fastener of Figures 2 and 3 is preferably used is illustrated in Figures 6 to 10, inclusive, in which 29 represents a fragment of a supporting structure having a plurality of aligned openings 30 therein, said apertures being provided where the molding, presently to be referred to, is to be secured. The fasteners of the present invention are assembled with respect to the supporting structure 29 by first hooking the hook-like leg 23 on one side of the aperture, the portion 26 of the fastener being disposed at an acute angle to the supporting structure 29 in order that this may be done as clearly illustrated in the enlarged view Figure 9A.

Pressure is then applied to the fastener in the direction illustrated by the arrow in the latter figure to cause the rounded shoulder 31 on the leg 21 to pass the other side of the aperture 30. The fastener is thus rocked into its final position at which the portion 26 bears firmly upon the outer surface of the supporting structure 29 over the aperture 30 and at each side of said aperture over a substantial area. The legs 21 and 23 are so spaced apart that when the fastener is in its final position, said legs are moved slightly towards each other, that is, the spacing of said legs normally slightly exceeds the diameter of the hole. Accordingly, in the final position of the fastener the edges of the supporting structure adjacent the aperture are wedged into firm contact with the under surface of the portion 26 of the fastener by said legs thus insuring an absence of play between the fastener and the supporting structure.

Furthermore, after the fastener is in position it engages the supporting structure with great tenacity inasmuch as one side of the fastener is hooked on said structure while the other side alone has a snap fastener engagement which serves to snugly maintain the engagement between the hook formed by the other leg and said structure. It should be readily understood that the fastener cannot be removed from the supporting structure by a straight pull away from said structure but can only be removed by first prying one side thereof away from said structure in order to free the fastener for removal in the reverse manner by which it was applied.

Each opening 30 in the supporting structure 29 is provided with a fastener. As illustrated in Figure 7, alternate fasteners, preferably, are reversed so that in some instances the hook-like leg engages one side of the aperture while in other instances it engages the other side for a purpose presently to be referred to.

After each aperture is provided with a fastener, the structure is ready to have the molding 32 applied thereto. Said molding may assume any form, that illustrated being selected merely for purposes of illustration. Ornamenting moldings of the type secured by the fasteners of the present invention generally include inturned flanges such as the flanges 33 and 34. The molding is engaged with the portions of the fasteners that protrude away from the supporting structure simply by snapping it on the portions 24 and 25. The portions 24 and 25 are so designed that when the molding is in final position, said portions are bent slightly towards each other; that is, normally the dimensions of the fastener measured across the point at which the molding is intended to contact slightly exceeds the space between the flanges 33 and 34 inasmuch as in actual practice the spacing of said flanges varies somewhat. Said dimension is made slightly greater than the maximum tolerated space between the molding flanges, so that regardless of variations in the spacing of said flanges a very firm grip between the fasteners and the molding is insured after the molding has been snapped into place, the portions 24 and 25 being bent more or less in accordance with said variations.

It will be understood that since the bending of the resilient portions 24 and 25 may occur entirely independently of the legs 21 and 23 that the connections of the fastener to the supporting structure is not disturbed in any manner by the degree of contraction of the fastener measured across the molding engaging portion.

It will be understood further that the curvature of the portions 24 and 25 assumes such form that the ends of the flanges 33 and 34 are wedged into firm contact with the outside of the supporting structure when the parts are in final assembled operation thus insuring an absence of play between the fasteners and the molding.

In view of the alternate reversed arrangement of the fasteners, they cannot be disengaged by pressing the molding laterally, hooked engagements being thus provided at each side of the molding.

Figures 6 to 10, inclusive, illustrate the preferred way of using the fastener of the present invention when it is not necessary to seal the apertures 30. It will be readily understood that when said apertures are to be sealed against the entrance of moisture, gaskets, such as already described, are first assembled with respect to the fasteners before the fasteners are secured to the supporting structure.

When such gaskets are used it will be understood that the assembly of the fasteners with respect to the structure is accomplished in the manner already described, and that the molding may be applied to the fasteners in precisely the same manner, the gasket being made of a thinness less than the thickness of the edges of the flanges of the moldings so that the retention of the molding against the support is not affected by the presence of the sealing means.

It will be understood that since the flat portion 26 of the fastener bears upon the gasket 26 over all of its area that is in contact with the outside of the supporting structure 29 that a very effective seal is provided inasmuch as, already stated, the legs 21 and 23 in final position serve to draw the portion 29 of the fastener toward the supporting structure thus compressing the gasket and insuring an effective seal.

If desired, the fastener of the present invention may be modified as illustrated in Figure 11 by constructing it from a shorter blank. In this form of the invention, instead of providing an inwardly curved flange at one end of the fastener, said end is simply provided with a slightly upturned portion 24'. In other respects the fastener is like that already described.

When the modified form of fastener is used, the molding is applied by first hooking the flange 34 beneath the portions 24' of the modified fastener, the molding being inclined in order to permit this to be accomplished. After one edge of the molding has thus been engaged with the portion 24', the molding is snapped past the portion 25 of the fastener to bring it into its final position.

The sealing means may be used with this form of the invention as with that first described. The advantages of the fastener of Figure 11 are substantially the same as those obtainable with the preferred form of fastener.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a support having apertures, fasteners having stud parts engaged in said apertures and aligned head parts comprising inwardly curved portions extending away from said support, the stud part of each fastener including a hook-like leg engaging one side of one of said apertures and a curved leg presenting a yieldable holding shoulder engaging the other side of said aperture, certain of said fasteners being reversed with respect to others so that said hook-like legs engage said apertures at one side and others at the other side, and a molding having inturned flanges snapped into engagement with said curved portions of the heads of said fasteners.

2. In combination, a support having a multiplicity of aligned apertures, a fastener having a stud portion engaged in each aperture, said stud portion comprising in each instance a bent-like leg providing a hook engagement with said support at one side of an aperture and a curved leg providing a snap fastener engagement with the support at the other side of the aperture, certain of said fasteners having a hook engagement effected through certain apertures from one side of the apertures and other fasteners having a hook engagement effected through other apertures from the other side of the apertures, each fastener having yieldable portions protruding away from said support, and a strip having fastener engagement with said yieldable portions.

3. A sheet metal molding fastener, comprising a head part consisting of a strip of metal having means for engaging a molding and a flat intermediate portion, said fastener having a stud part consisting only of two legs in the form of tongues, struck from said strip, and curved laterally in the same direction on substantially concentric arcs; and a gasket in the form of a resilient sealing disc having spaced openings through which said tongues pass, said tongues positioning said gasket beneath said flat intermediate portion.

4. In combination, a support having an aperture, a molding fastener seated in said aperture, said fastener comprising a head part comprising a strip of metal having a flat intermediate portion and portions extending upwardly and outwardly therefrom, said fastener having a stud part comprising legs in the form of tongues struck from said strip and curved laterally in the same direction on substantially concentric axes, a gasket in the form of a resilient sealing disc having spaced openings through which said tongues pass, said tongues positioning said gasket between said support and the flat intermediate portion of said head, and a molding having flanges clamped between said support and the extended portions of said head, the thickness of the molding flanges exceeding that of the sealing disc, and the space between the flanges at least equaling the diameter of the said disc.

BION C. PLACE.